Patented Oct. 13, 1931

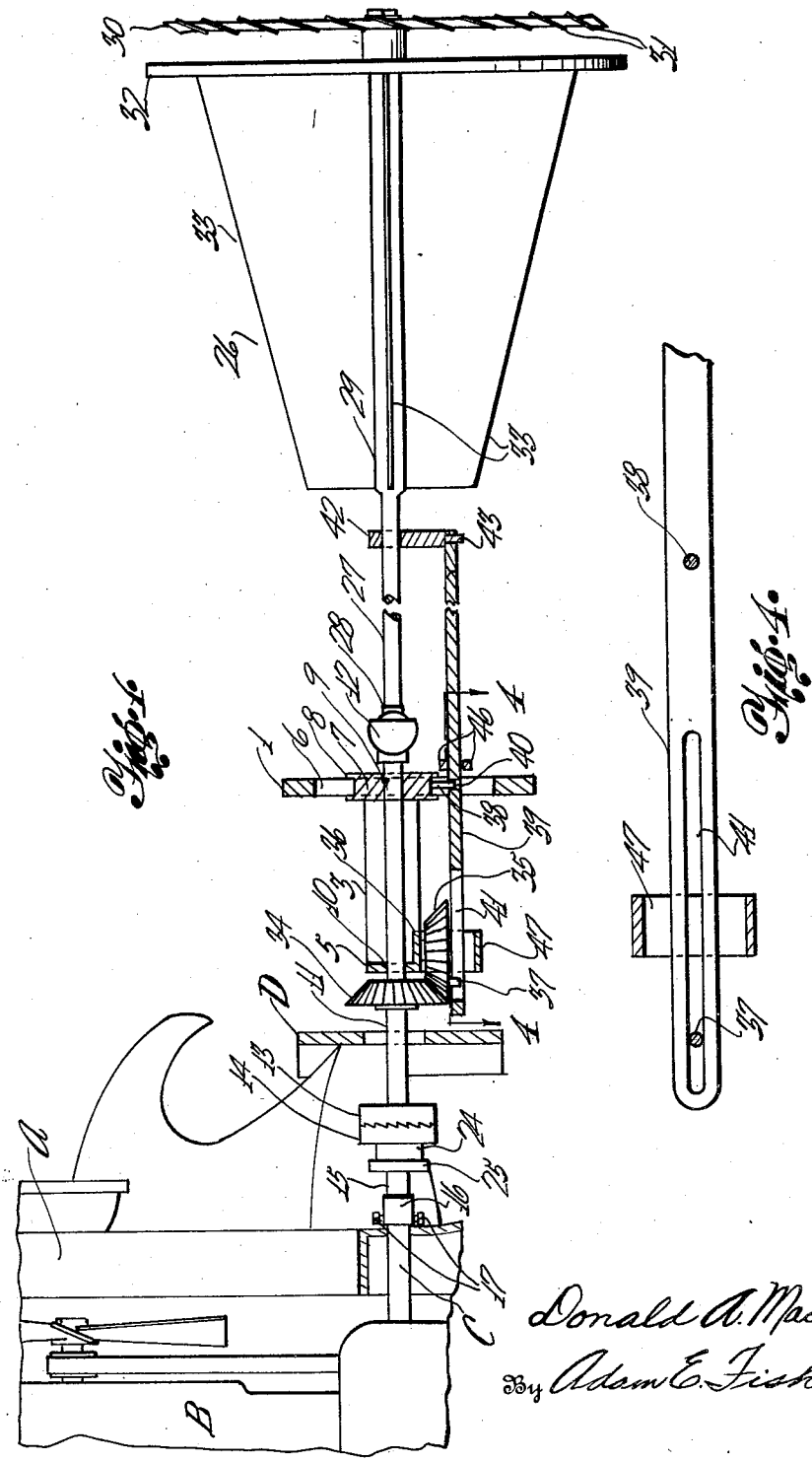

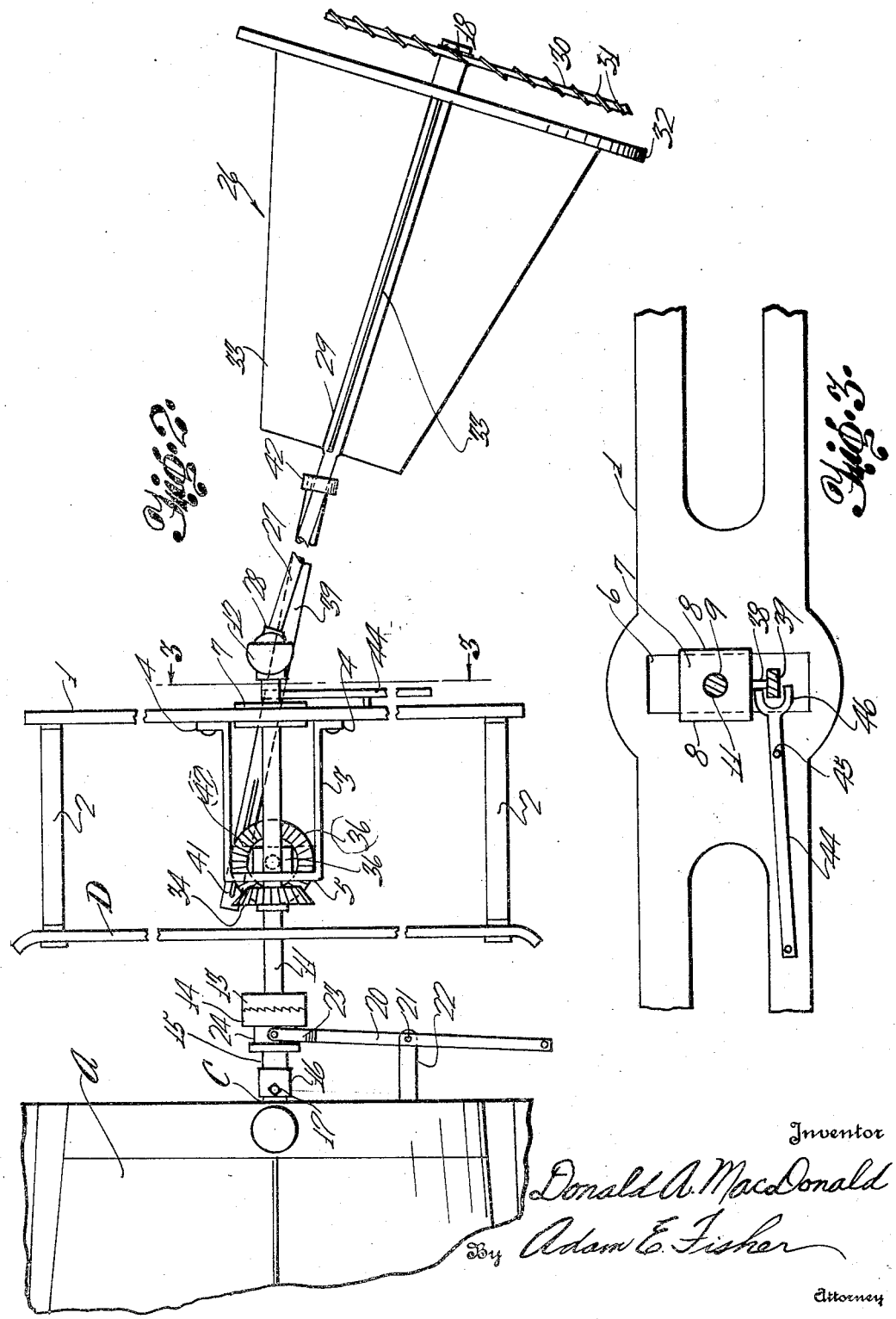

1,826,804

UNITED STATES PATENT OFFICE

DONALD A. MACDONALD, OF ST. PETERS, NOVA SCOTIA, CANADA

SNOWPLOW

Application filed October 27, 1930. Serial No. 491,361.

My invention relates to improvements in snow plows and the main object is to provide a snow plow adapted to be mounted at the front of a motor vehicle and connected to the motor therein in such manner that it may be operated to clear the snow from the road so that a clear path will be provided for the passage of the vehicle.

Another object is to provide a snow plow of the above character including a forwardly extending cleaning or plowing element which is so arranged that it rotates on its own axis to clear the road of snow and also oscillates from side to side as it rotates to provide a relatively wide cleared path for the vehicle.

Another object is to provide a snow plow of the character described in a simple, efficient and durable form and one which may be readily mounted on the vehicle and controlled by the driver thereof.

With the foregoing and other objects in view the invention resides in the novel construction and arrangement of parts as hereinafter set forth and claimed, reference being had to the accompanying drawing wherein:

Figure 1 is a side view, partially in section, showing the snow plow mounted on the front of a motor vehicle, only a portion of the latter being shown.

Figure 2 is a plan view of the structure shown in Figure 1.

Figure 3 is an enlarged sectional detail view taken on the line 3—3 in Figure 2.

Figure 4 is an enlarged sectional detail view taken on the line 4—4 in Figure 1.

Referring now more particularly to the drawing the reference character A designates the forward end of a motor vehicle in which is mounted the engine B driving the crankshaft C which is forwardly extended from the engine in the usual manner for the connection of a crank (not shown) when necessary. A bumper D is mounted in front of the vehicle A. The foregoing elements are of conventional form and no invention therefor is herein claimed.

In carrying out my invention I provide a supporting frame or bar 1 of elongated flat form and secured forwardly of and in parallelism with the bumper D by the connecting bars or brackets 2 disposed near the ends of the said supporting frame 1, said bars being extended rearwardly and secured to the said bumper as shown. A U-shaped bracket 3 is provided and the same is secured by feet 4 to the rear of the supporting frame 1 at the center thereof, the bight or connecting base 5 of the said bracket being thus disposed rearwardly of and in parallelism with the said supporting frame. The supporting frame 1 is provided at its center with a vertically extended slot 6 in which a bearing block 7 is slidably mounted as shown, the said block having lips 8 overlying the margins of the slot 6 and having also a central aperture 9 for a purpose to be described. The U-shaped bracket 3 is provided with an aperture 10 through its bight 5 and a drive shaft 11 is journaled through this aperture 10 and through the aperture 9 in the bearing block 7. At its forward end the shaft 11 is extended just beyond the bearing block 7 and is provided with a universal joint 12 of conventional form and at its rear end the shaft extends through the bumper D and terminates considerably short of the forward end of the crankshaft C. The bumper D as here shown is of the split type composed of two vertically spaced bars thus providing a space therebetween for the passage of the drive shaft 11, however an aperture might be provided for the shaft in a bumper of different construction. A clutch member or jaw 13 is secured on the rear end of the drive shaft 11 and this jaw 13 is adapted to mesh with or engage a similar jaw 14 slidably keyed on the stub shaft 15 detachably secured on the forward end of the crankshaft C by the collar 16 and set screws 17. An operating lever 20 is fulcrumed at 21 on a bracket 22 suitably secured to the front of the motor vehicle A, and the end of this lever 20 is forked at 23 to ride in a groove 24 provided in the hub 25 of the jaw 14 for its reception. The clutch jaw 14 may be moved into or out of engagement with the jaw 13 by properly swinging the lever 20 and the drive shaft 11 may thus be connected to or disconnected from the crankshaft C at will, the said drive shaft being of course rotated by the crankshaft when the two are connected. The cleaning elements or mechanism 26 for cleaning the snow from the road comprises a shaft 27 connected at 28 to the universal joint 12 and extended forwardly therefrom, the forward portion of the shaft being enlarged and square in cross section as designated at 29. A circular cutting disk 30 having angularly set teeth 31 around its periphery is secured to the end of the shaft 27 by a screw 18 threaded in the end of the shaft or by any other suitable fastening means. Rearwardly of the cutting disk 30 a guard or supporting disk 32 is secured to the shaft 27, and this disk 32 is of greater diameter than the cutting disk 30. Blades or wings 33 are secured in radially spaced relationship to the faces of the squared portion 29 of the shaft 27 immediately to the rear of the disk 32, the said blades preferably, but not necessarily, tapering towards their rear ends as shown. The foregoing elements will be rotated as the drive shaft 11 is rotated and the disk 30 will thus cut the snow from the road and loosen it so that the blades 33 may throw it to the side as will be understood. The disk 32 being of greater diameter than the cutting disk 30 holds the same off the road and protects the teeth 31 thereof against injury by coming in contact with the road.

A beveled pinion 34 is secured on the drive shaft 11 rearwardly of the bight 5 of the bracket 3 and a beveled gear 35 is journaled beneath an ear or lip 36 extended horizontally forward from the lower edge of the said bight 5, the said pinion and gear being thus meshed as shown. The gear 35 carries an eccentrically disposed pin 37 on its lower face and a fulcrum pin 38 is depended from the bearing block 7 below the aperture 9 therein. An oscillating or rocking bar 39 is provided and the same has an aperture 40 intermediate its ends to receive the said fulcrum pin 38 and an elongated longitudinal slot 41 near its rear end to receive the said pin 37 on the gear 35. At the forward end of the bar 39 an eye 42 is swiveled as shown at 43 and the shaft 27 of the cleaning mechanism 26 is loosely passed through this eye, the said eye engaging the shaft forwardly of the universal joint 12. A shifting lever 44 is fulcrumed at 45 to the supporting frame 1 to one side of the center thereof and the said lever is forked at one end 46 and is thus adapted to straddle or embrace the rock bar 39 near its fulcrum point. This lever 44 serves to hold the rock bar up in engagement with the pins 37 and 38 or to lower the rock bar out of engagement with the pins as desired. When the said rock bar is lowered it is supported at its rear end on a U-shaped yoke or hanger 47 depended from the rear end of the bracket 3 and the bar is further supported near its center on the lower edge of the slot 6 in the supporting frame 1. The rotation of the gear 35 by the pinion 34 will impart a swinging or rocking movement to the bar 39 by the movement of the pin 37 in the slot 41 and the shaft 27 carrying the cleaning elements 26 will thus be swung from side to side with the universal joint 12 as its pivoted point. In this manner a comparatively wide path in front of the motor vehicle will be cleared of snow. When the oscillatory movement of the cleaning elements is not desired or needed the bar 39 may be disengaged from the pins 37 and 38 by operation of the shifting lever 44 as aforesaid. The device thus may be also used for cleaning the snow from walks and the like and for this use the cleaning elements 26 as herein described may be removed and replaced with a brush or other suitable tool. The levers 20 and 44 may be readily arranged for operation from within the motor vehicle by suitable operating rods or cables (not shown).

While I have herein set forth a certain preferred embodiment of my invention it is understood that I may vary from the same in minor structural details so as best to construct a practical device for the purposes intended, not departing from the spirit of the invention and within the scope of the appended claims.

I claim:

1. In a device of the kind described, in combination with a motor vehicle and an engine therein, a supporting frame mounted on the vehicle, a drive shaft journaled in the supporting frame and detachably connected to the engine for rotation thereby, a cleaning mechanism operatably connected to the drive shaft, and cooperating means connected to the drive shaft and cleaning mechanism whereby the latter will be oscillated by the rotation of the said drive shaft.

2. In a device of the kind described, in combination with a motor vehicle and an engine therein, a supporting frame mounted on the front of the vehicle, a drive shaft journaled in the supporting frame and extended forwardly from the vehicle, the said drive shaft being releasably connected to the engine in the vehicle for rotation thereby, a universal joint on the forward end of the drive shaft, a cleaning mechanism connected to the said universal joint, and means whereby the cleaning mechanism will be swung from side to side by rotation of the drive shaft.

3. In a device of the kind described, in combination with a motor vehicle, and an engine therein, a supporting frame secured to the front of the vehicle, a bearing slidably mounted in the supporting frame, a bracket on the supporting frame, a drive shaft journaled through the said bearing and bracket and extended forwardly from the vehicle, means for releasably connecting the rear end of the drive shaft with the engine whereby the engine will rotate the said drive shaft, a universal joint on the forward end of the drive shaft, a cleaning mechanism connected to the said universal joint, a beveled pinion on the drive shaft, a beveled gear journaled on the bracket in mesh with the said pinion, a pin eccentrically positioned on the gear and a rocking bar fulcrumed intermediate its ends to the bearing in the supporting frame, the said rocking bar having a longitudinal slot in its rear end to receive the said pin on the gear and being connected at its forward end to the cleaning mechanism.

4. In a device of the kind described, in combination with a motor vehicle, and an engine therein, a supporting frame secured to the front of the vehicle, a bearing slidably mounted in the supporting frame, a bracket on the supporting frame, a drive shaft journaled through the said bearing and bracket and extended forwardly from the vehicle, means for releasably connecting the rear end of the drive shaft with the engine whereby the engine will rotate the said drive shaft, a universal joint on the forward end of the drive shaft, a cleaning mechanism connected to the said universal joint, a beveled pinion on the drive shaft, a beveled gear journaled on the bracket in mesh with the said pinion, a pin eccentrically positioned on the gear and a rocking bar fulcrumed intermediate its ends to the bearing in the supporting frame, the said rocking bar having a longitudinal slot in its rear end to receive the said pin on the gear and being connected at its forward end to the cleaning mechanism, a shifting lever mounted on the supporting frame and connected to the rocking bar whereby the same may be disengaged from the said pin on the gear.

5. In a device of the kind described, in combination with a motor vehicle and an engine therein, a supporting frame mounted on the vehicle, a drive shaft journaled in the frame and releasably connected at its rear end to the said engine for rotation thereby, a shaft connected to the forward end of the drive shaft, a toothed cutting disk secured to the forward end of the shaft, a guard disk mounted on the shaft rearwardly of the cutting disk, the said guard disk being of greater diameter than the cutting disk, and a plurality of blades mounted in radially spaced relationship on the shaft rearwardly of the guard disk.

In testimony whereof I affix my signature.

DONALD A. MACDONALD.